US011908367B2

(12) United States Patent
Wu et al.

(10) Patent No.: US 11,908,367 B2
(45) Date of Patent: Feb. 20, 2024

(54) DISPLAY DEVICE AND COLOR SETTING METHOD BASED ON USER SELECTIONS

(71) Applicant: BOE Technology Group Co., Ltd., Beijing (CN)

(72) Inventors: Chao Wu, Beijing (CN); Yilin Lin, Beijing (CN); Kui Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 20 days.

(21) Appl. No.: 17/411,872

(22) Filed: Aug. 25, 2021

(65) Prior Publication Data

US 2022/0309982 A1 Sep. 29, 2022

(30) Foreign Application Priority Data

Mar. 25, 2021 (CN) ........................ 202110319497.3

(51) Int. Cl.
*G09G 3/20* (2006.01)

(52) U.S. Cl.
CPC ... *G09G 3/2003* (2013.01); *G09G 2320/0666* (2013.01); *G09G 2320/08* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 2009/0167780 A1* | 7/2009 | Jung | H04N 1/628 | 345/594 |
| 2010/0122042 A1* | 5/2010 | Lin | G09G 5/003 | 345/594 |
| 2014/0240340 A1* | 8/2014 | Shirasawa | G09G 5/02 | 345/590 |
| 2017/0205977 A1* | 7/2017 | Fertik | G06F 3/0483 | |
| 2019/0094554 A1* | 3/2019 | Benesh | G06T 11/001 | |
| 2021/0026505 A1* | 1/2021 | Ma | G06F 3/0482 | |
| 2021/0215517 A1* | 7/2021 | Bensalem | G01D 11/26 | |
| 2022/0022307 A1* | 1/2022 | Wang | H05B 47/19 | |

* cited by examiner

*Primary Examiner* — Benjamin C Lee
*Assistant Examiner* — Emily J Frank
(74) *Attorney, Agent, or Firm* — IPro, PLLC

(57) ABSTRACT

A color setting method includes: displaying multiple groups of color pictures respectively according to a pre-set sequence, each group of color pictures including at least two pictures, and each picture including at least one color component; marking a selected picture in each group of color pictures in response to a first operation by a user; acquiring a user's color preferences according to a plurality of selected pictures and color components of each picture; setting color parameters of a display device according to the color preferences.

20 Claims, 2 Drawing Sheets

DISPLAY DEVICE AND COLOR SETTING METHOD BASED ON USER SELECTIONS

CROSS-REFERENCE TO RELATED APPLICATIONS

The present application claims priority to Chinese Patent Application No. 202110319497.3 filed in China on Mar. 25, 2021, which is incorporated herein by reference in its entirety.

TECHNICAL FIELD

The present disclosure relates to the field of display technology, and in particular to a color setting method for a display device, a display device, a non-transitory computer readable storage medium, and computer equipment.

BACKGROUND

Displays, televisions and other screen display products are distributed throughout every corner of our lives. Different brands of display devices have their own style of display-related parameters and databases. The adjustment and judgment criteria of these parameters are usually based on the subjective evaluation of professional picture quality personnel of each company, while the "good-looking" criteria are often the case that everyone has their own aesthetic and judgment, which are different from person to person and cannot be unified. As such, different brands of display devices have different color styles, with some brands having warmer colors, some having cooler colors, some having brighter colors, and the like. For the end user, one may only select brand A if he prefers a bright color, and one may only select brand B if he prefers a cool color, and so forth. It is easy to form the user's inherent feeling towards the brand for a long time. The product style is limited and solidified by the user's awareness, resulting in great limitations of both product and user groups.

Moreover, the existing display device color correction methods are not intuitive, and if the user is not satisfied with factory settings of the picture color of the display device, it is usually necessary to perform cumbersome adjustment of parameters such as numbers, histograms or curves in the setting menu. Ordinary users are unfamiliar with these display parameters, and often keep factory settings without adjustment during use or make the situation worse or less ideal after adjustment due to the lack of understanding of the specific meaning of each parameter, thereby affecting the user's perception and even the user's favorability of the brand.

SUMMARY

In a first aspect, embodiments of the present disclosure provide a color setting method of a display device, including: displaying multiple groups of color pictures respectively according to a pre-set sequence, wherein each group of color pictures includes at least two pictures, and each picture includes at least one color component; marking a selected picture in each group of color pictures in response to a first operation by a user; acquiring color preferences regarding a user according to a plurality of selected pictures and color components of each picture; and setting color parameters of the display device according to the color preferences.

According to an alternative embodiment of the present disclosure, the acquiring color preferences regarding a user according to a plurality of selected pictures and color components of each picture further includes: acquiring color data regarding the user according to a plurality of selected pictures and color components of each picture; and correcting the color data according to a preset preference template and acquiring color preferences regarding the user.

According to an alternative embodiment of the present disclosure, the acquiring color data regarding a user according to a plurality of selected pictures and color components of each picture further includes: reading color parameters of the display device; and acquiring color data regarding the user according to color parameters of the display device, a plurality of selected pictures and color components of each picture.

According to an alternative embodiment of the present disclosure, the acquiring color data regarding the user according to a plurality of selected pictures and components of each picture further includes: uploading a plurality of selected pictures and color components of each picture to a remote server so as to acquire color data regarding the user; and the correcting the color data according to a preset preference template and acquiring color preferences regarding the user further includes: causing the remote server to correct the color data according to a preset preference template to acquire color preferences regarding the user.

According to an alternative embodiment of the present disclosure, before displaying multiple groups of color pictures respectively according to a pre-set sequence, each group of color pictures including at least two pictures, and each picture including at least one color component, the color setting method further includes: displaying color preference setting options; selecting to set the color preferences in response to a second operation by the user, or cancelling the setting of the color preferences in response to a third operation by the user.

According to an alternative embodiment of the present disclosure, the selecting to set the color preferences in response to a second operation by the user further includes: uploading configuration parameters of the display device to a remote server; and downloading multiple groups of color pictures corresponding to the display device from the remote server.

According to an alternative embodiment of the present disclosure, after the displaying color preference setting options and before the selecting to set the color preferences in response to a second operation by the user, the color setting method further includes: displaying color restoration setting options; selecting to restore the components in response to a fourth operation by the user, or cancelling the restoring of the color components in response to a fifth operation by the user.

According to an alternative embodiment of the present disclosure, the color components include one or more of brightness, contrast, saturation, hue, clarity, backlight, color temperature, noise reduction, color enhancement, gamma; and/or each group of color pictures includes at least two pictures having the same picture content.

In a second aspect, embodiments of the present disclosure also provide a display device including a memory, a processor, and a computer program stored in the memory and executable on the processor, wherein the processor when executing the program implements a color setting method of the display device, the color setting method including: displaying multiple groups of color pictures respectively according to a pre-set sequence, wherein each group of color pictures includes at least two pictures, and each picture includes at least one color component; marking a selected picture in each group of color pictures in response to a first operation by a user; acquiring color preferences regarding a user according to a plurality of selected pictures and color components of each picture; and setting color parameters of the display device according to the color preferences.

According to an alternative embodiment of the present disclosure, the acquiring color preferences regarding a user according to a plurality of selected pictures and color components of each picture further includes: acquiring color data regarding the user according to a plurality of selected pictures and color components of each picture; and correcting the color data according to a preset preference template and acquiring color preferences regarding the user.

According to an alternative embodiment of the present disclosure, the acquiring color data regarding a user according to a plurality of selected pictures and color components of each picture further includes: reading color parameters of the display device; and acquiring color data regarding the user according to color parameters of the display device, a plurality of selected pictures and color components of each picture.

According to an alternative embodiment of the present disclosure, the acquiring color data regarding the user according to a plurality of selected pictures and components of each picture further includes: uploading a plurality of selected pictures and color components of each picture to a remote server so as to acquire color data regarding the user; and the correcting the color data according to a preset preference template and acquiring color preferences regarding the user further includes: causing the remote server to correct the color data according to a preset preference template to acquire color preferences regarding the user.

According to an alternative embodiment of the present disclosure, before displaying multiple groups of color pictures respectively according to a pre-set sequence, each group of color pictures including at least two pictures, and each picture including at least one color component, the color setting method further includes: displaying color preference setting options; selecting to set the color preferences in response to a second operation by the user, or cancelling the setting of the color preferences in response to a third operation by the user.

According to an alternative embodiment of the present disclosure, the selecting to set the color preferences in response to a second operation by the user further includes: uploading configuration parameters of the display device to a remote server; and downloading multiple groups of color pictures corresponding to the display device from the remote server.

According to an alternative embodiment of the present disclosure, after the displaying color preference setting options and before the selecting to set the color preferences in response to a second operation by the user, the color setting method further includes: displaying color restoration setting options; selecting to restore the components in response to a fourth operation by the user, or cancelling the restoring of the color components in response to a fifth operation by the user.

According to an alternative embodiment of the present disclosure, the color components include one or more of brightness, contrast, saturation, hue, clarity, backlight, color temperature, noise reduction, color enhancement, gamma; and/or each group of color pictures includes at least two pictures having the same picture content.

In a third aspect, embodiments of the present disclosure also provide a non-transitory computer readable storage medium having a computer program stored thereon, wherein the computer program when executed by a processor implements a color setting method of a display device, the color setting method including: displaying multiple groups of color pictures respectively according to a pre-set sequence, wherein each group of color pictures includes at least two pictures, and each picture includes at least one color component; marking a selected picture in each group of color pictures in response to a first operation by a user; acquiring color preferences regarding a user according to a plurality of selected pictures and color components of each picture; and setting color parameters of the display device according to the color preferences.

According to an alternative embodiment of the present disclosure, the acquiring color preferences regarding a user according to a plurality of selected pictures and color components of each picture further includes: acquiring color data regarding the user according to a plurality of selected pictures and color components of each picture; and correcting the color data according to a preset preference template and acquiring color preferences regarding the user.

According to an alternative embodiment of the present disclosure, the acquiring color data regarding a user according to a plurality of selected pictures and color components of each picture further includes: reading color parameters of the display device; and acquiring color data regarding the user according to color parameters of the display device, a plurality of selected pictures and color components of each picture.

According to an alternative embodiment of the present disclosure, the acquiring color data regarding the user according to a plurality of selected pictures and components of each picture further includes: uploading a plurality of selected pictures and color components of each picture to a remote server so as to acquire color data regarding the user; and the correcting the color data according to a preset preference template and acquiring color preferences regarding the user further includes: causing the remote server to correct the color data according to a preset preference template to acquire color preferences regarding the user.

BRIEF DESCRIPTION OF THE DRAWINGS

In order to more clearly explain technical solutions in the embodiments of the present disclosure, a brief description will be given below with reference to the accompanying drawings to be used in the description of the embodiments, and it is obvious that the drawings in the description below are only some embodiments of the present disclosure, and other drawings can be obtained from these drawings by a person skilled in the art without involving any inventive effort.

DETAILED DESCRIPTION

Figure 1:
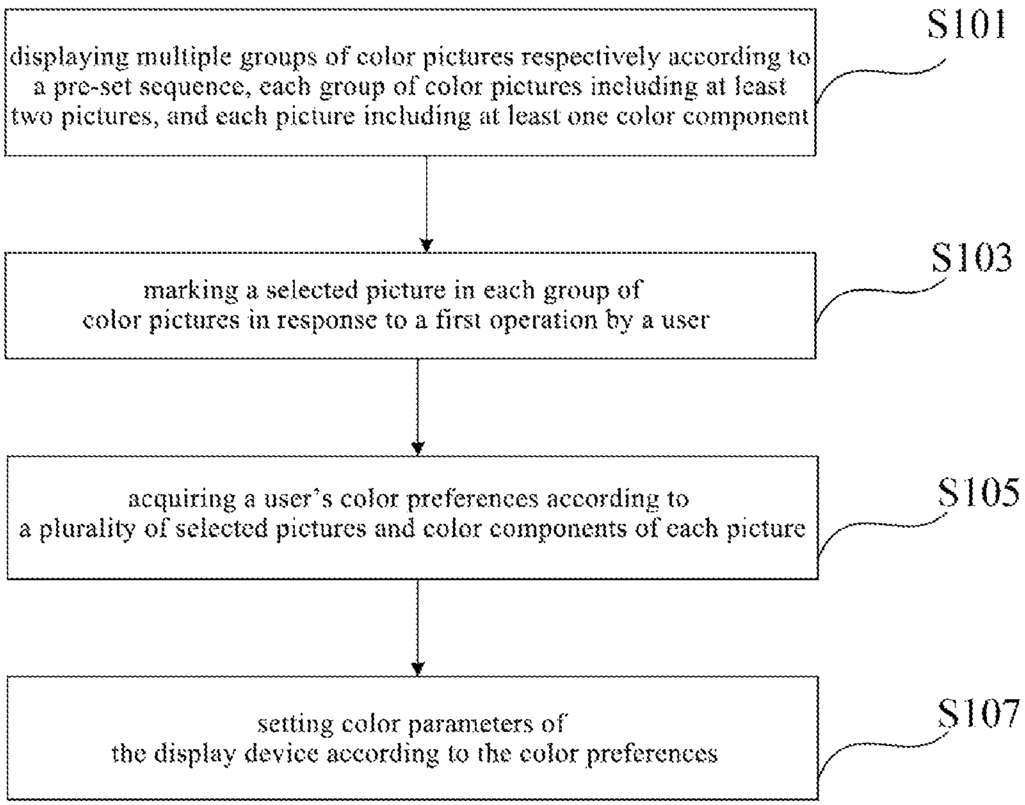
FIG. 1 shows a schematic flow chart of a color setting method according to an embodiment of the present disclosure.

To more clearly illustrate the present disclosure, a further description of the disclosure is provided below in connection with preferred embodiments and the accompanying drawings. Like parts in the drawings are denoted by the same reference numerals. It is to be understood by persons of ordinary skill in the art that the following detailed description is illustrative and not restrictive, and is not intended to limit the scope of the present disclosure.

It should be noted that references to “having”, “comprising”, “including”, and the like in this disclosure are open-ended meaning that when a module is described as “having”, “comprising”, or “including” a first element, a second element, and/or a third element, it is meant that the module includes additional elements in addition to the first element, second element, and/or third element. Furthermore, the use of ordinal terms such as “first”, “second”, and “third” in the present disclosure is not intended to limit the particular order, but merely to distinguish between the various parts.

In order to solve one of the above problems, as shown in FIG. 1, an embodiment of the present disclosure provides a color setting method of a display device, including: S101, displaying multiple groups of color pictures respectively according to a pre-set sequence, wherein each group of color pictures includes at least two pictures, and each picture includes at least one color component; S103, marking a selected picture in each group of color pictures in response to a first operation by a user; S105, acquiring color preferences regarding a user according to a plurality of selected pictures and color components of each picture; S107, setting color parameters of the display device according to the color preferences.

In the present embodiment, by respectively displaying multiple groups of color pictures on a display device, and setting color parameters of the display device according to color preferences determined by the pictures selected by a user, a user can obtain a required color setting in an intuitive manner, so that the display device has display parameters with adjustable styles, improving adaptability to user requirements, and having a wide application prospect.

In one specific example, as shown in FIG. 1, in S101, multiple groups of color pictures are respectively displayed according to a pre-set sequence, each group of color pictures including at least two pictures, each picture in each group of pictures including at least one color component, for example. Color components include, but are not limited to, one or more of brightness, contrast, saturation, hue, clarity, backlight, color temperature, noise reduction, color enhancement, gamma.

It should be noted that this disclosure is not intended to limit the number of pictures in each group of color pictures, nor is it intended to limit the number of groups of color pictures displayed on a display device. It will be appreciated that the designer may design the color component categories of the display device, the color component categories included in each group of color pictures, and the adjustable range and grading for each color component as desired.

For example, 2 groups of color pictures A and B may be displayed sequentially on the display device, each group of color pictures including 3 pictures. The color components of each picture in the color picture group A are: brightness, saturation and clarity; the color components of each picture in color picture group B are: contrast and hue. Because each group of color pictures contains 3 pictures, the number of gradations that can be adjusted for each group of color components is 3. As another example, 3 groups of pictures A, B and C may also be displayed sequentially on the display device, each group of pictures likewise including 2 pictures. The color components of each picture in the color picture group A are: brightness and saturation; the color components of each picture in the color picture group B are: clarity and contrast; the color component of each picture in the color picture group C is: hue. Because each group of color pictures contains 2 pictures, the number of gradations adjustable for each group of color components is 2.

It can be seen that the number of groups of pictures does not necessarily define the total dimension of the adjustable color components of the display device, and the number of gradations adjustable for each color component is related to the number of pictures in each group.

Alternatively, the picture contents included in each group of color pictures are the same, and the arrangement is such that the difference on the pictures in each group of pictures only lie in the above color components, so that it is possible to avoid subjective interference factors caused by the user’s preference for the content ontology, and thus avoid affecting the accuracy of the subsequent parameter correction.

In order to facilitate the description of specific examples, the following applies: displaying 2 groups of color pictures A and B on a display device, wherein each group of color pictures includes 3 pictures; the color components of each picture in the color picture group A are brightness, saturation and clarity; and the color components of each picture in the color picture group B are contrast and hue.

In S103, the selected picture in each group of color pictures is marked in response to a first operation by the user.

Specifically, the user selects 1 picture in each group of color pictures displayed on the display device, and the selection can be made according to personal preferences after the user browses all the pictures in each group of color pictures. The display device marks the selected picture according to each selection operation of the user.

In S105, the display device acquires the user’s color preferences according to the 2 selected pictures and the color components of each picture.

Specifically, the display device acquires color data regarding the user according to a plurality of selected pictures and color components of each picture. For example, the color components of the 3 pictures included in the color picture group A are respectively:

picture A-1: brightness (50), saturation (50), clarity (50);
picture A-2: brightness (55), saturation (50), clarity (70);
picture A-3: brightness (60), saturation (40), clarity (70).

For example, the color components of the 3 pictures included in the color picture group B are respectively:

picture B-1: contrast (40), hue (0);
picture B-2: contrast (40), hue (10);
picture B-3: contrast (60), hue (−5).

A user selects a picture A-3 and a picture B-2 respectively in the two displays of the color picture group A and the color picture group B, and according to the corresponding color component in the selected picture, the display device acquires the color effect shown by color preferences regarding the user for the picture A-3 and the picture B-2. Meanwhile, since the color effects of the selected picture A-3 and the picture B-2 respectively correspond to a specific brightness value of 60, a saturation value of 40, a clarity value of 70, a contrast value of 40, and a hue of 10, the display effect represented by each picture corresponds to a specific color component. And accordingly, the display device acquires color data regarding the user, namely, the brightness value of 60, the saturation value of 40, the clarity value of 70, the contrast value of 40 and the color temperature value of 10, and then the display device acquires color preferences regarding the user according to the color data.

In order to further improve the accuracy of the color adjustment of the display device, a preference template is optionally pre-set in the display device, and after acquiring color data regarding the user according to the 2 selected pictures and the color components of each picture, the color data are corrected according to the pre-set preference template and color preferences regarding the user are acquired.

In particular, because of the different nature of the color components, different preference templates are pre-stored in the display device. For example, for color components having specific values for brightness, saturation, clarity, contrast, hue, backlight, gamma, etc., the preference template is set to select a value corresponding to the color component selected by the user. For color components where the color temperature is graded in standard, cool color and warm color, the preference template selects the color wavelength corresponding to the selected one of the standard, cool color and warm color. In addition, for color components distinguished by YES or NO such as noise reduction, color enhancement, or the like, the preference template is set to be ON or OFF.

In addition, as those skilled in the art of ordinary skill in the art based on routine knowledge, the specific form of the above preference template may be, for example, a table form, a bar graph form, a check option form, a slider form, a numerical entry form, etc. to which embodiments of the present disclosure are not limited. On the contrary, one skilled in the art can make various alternatives, modifications and additions.

Of course, the above is merely exemplary, and the variety of color components is not limited to the ranges recited above, nor is the above-recited preference template intended to be limiting, e.g. the preference template may also select a pre-stored fitted curve corresponding to the selected color component.

Further, the display device corrects the color data according to the preset preference template and acquires the user's color preferences. Specifically, according to the preset preference template, the display device corrects the color parameters thereof to be consistent with the color data of the picture A-3 and the picture B-2 selected by the user, for example, a brightness value of 60, a saturation value of 40, a clarity value of 70, a contrast value of 40 and a color temperature value of 10, and acquires color preferences regarding the user.

In S107, the color parameters of the display device are set according to the color preferences. The display device sets the color parameters of the display device as the corrected color data according to the user's color preferences, i.e. the color data obtained after correction based on the preset preference template.

In the above-mentioned manner, by respectively displaying multiple groups of color pictures on a display device, and setting color parameters of the display device according to color preferences determined by a picture selected by a user, personalized setting of color preferences can be provided for the user in an intuitive manner, so that the display device has display parameters with adjustable styles, and the user experience is effectively improved.

In an optional embodiment, considering that the display device itself has original color parameters when displaying each group of color pictures, the preferred picture selected by the user based on the display of the display device possesses not only the effect of the parameters of the picture itself, but also the combined effect of the color parameters of the display device and the color data of the picture.

In order to make the final display effect of the color parameters after the display device is reset consistent with the above-mentioned combined effect, namely, in order to enable a user to obtain a display effect consistent with the color effect seen thereby, acquiring color data regarding the user according to a plurality of selected pictures and color components of each picture further includes: reading color parameters of a display device; and acquiring the user's color data according to the read color parameters of the display device, a plurality of selected pictures and color components of each picture.

Specifically, the color parameters of the display device are read, and according to the read color parameters of the display device, the selected picture A-3 and picture B-2, and the color components of the picture A-3 and picture B-2, the superimposed values of the color components of the selected pictures and the color parameters of the display device are acquired. For example, when the display device displays each group of color pictures A and B, the color parameters are: the brightness value of 50, the saturation value of 50, the clarity value of 70, the contrast value of 40 and the color temperature value of −5. After reading the above-mentioned color parameters of the display device, the acquired color data of the user is, for example: the brightness value of 110, the saturation value of 90, the clarity value of 140, the contrast value of 80 and the color temperature value of 5.

Further, when the color data of the display device is corrected again through the preset preference template, the corrected color data obtained based on the user-selected picture A-3 and picture B-2 is no longer a brightness value of 60, a saturation value of 40, a clarity value of 70, a contrast value of 40, and a color temperature value of 10, but becomes a brightness value of 110, a saturation value of 90, a clarity value of 140, a contrast value of 80, and a color temperature value of 5. Next, in S107, the color parameters of the display device set according to the color preferences are also the corrected color data.

By the above arrangement, when the display device is to be displayed with the corrected color parameters, the display effect obtained is substantially consistent with the effect of a preferred picture that the user has selected from multiple groups of color pictures, further improving the user experience.

In some optional embodiments, in order to simplify the hardware structure of the display device, for example, when the color setting method is applied to a light-weight display device such as head-mounted display equipment, a cell phone, or a tablet computer, it is considered that a remote server performs a part of the setting steps in order to simplify the hardware structure of the display device.

Specifically, the 2 selected pictures and the color components of each picture are uploaded to a remote server so as to acquire color data regarding a user; and the remote server is caused to correct the color data according to the preset preference template to acquire the user's color preferences. Then, the display device sets the color parameters of the display device according to color preferences regarding the user acquired to complete the correction setting of the display parameters of the display device.

In some optional embodiments, before S101, namely, before displaying multiple groups of color pictures respectively according to a pre-set sequence, wherein each group of color pictures includes at least two pictures, and each picture includes at least one color component, the above-mentioned color setting method further includes: displaying a color preference setting option on the display device to provide the user with a choice of whether to set the color preferences. Thus, the display device selects to set the color preferences in response to a second operation by the user, such as clicking "OK", or cancels the setting the color preferences in response to a third operation by the user, such as clicking "Cancel".

Further optionally, when the color preferences are selected to set in response to a second operation by the user, the above color setting method further includes: uploading configuration parameters of a display device to a remote server, and downloading multiple groups of color pictures corresponding to the display device from the remote server, so as to match suitable color pictures and optimize color settings for the display device in real time.

Further optionally, in view of the fact that the display device is not always exclusively used by a certain user, the display device could also be able to provide a new user with his or her preferred color display effect when the user is replaced.

Therefore, after displaying the color preference setting option, before selecting to set the color preferences in response to a second operation by the user, the above color setting method further includes the following steps: the display device displays a color restoration setting option, and the display device selects to restore color components in response to a fourth operation by the user, for example, clicking "Restore", in order to again enter the color setting processes of S101 to S107 shown in FIG. 1, or the display device cancels the restoring of color components in response to a fifth operation by the user, for example, clicking "Cancel".

Figure 2:
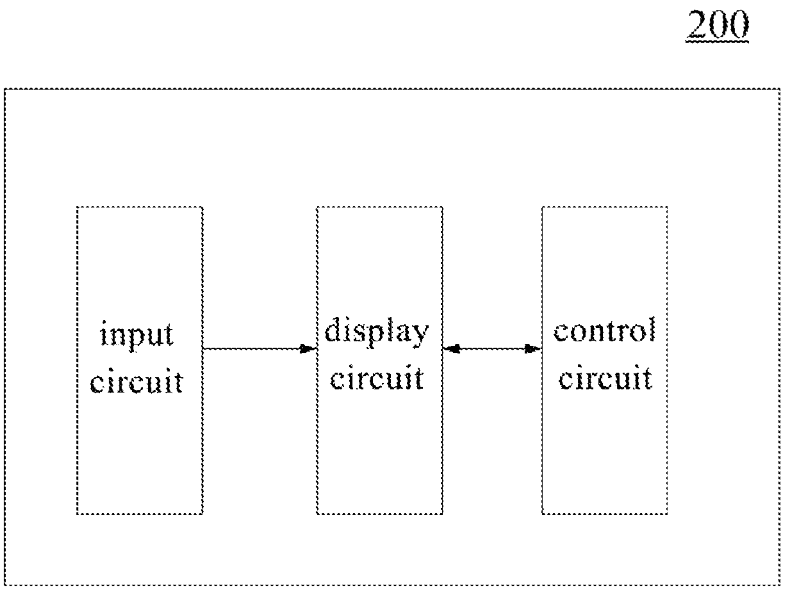
FIG. 2 shows a schematic block diagram of a display device according to an embodiment of the present disclosure.

In correspondence with the color setting method of the display device provided by the above embodiment, as shown in FIG. 2, one embodiment of the present application further provides a display device 200 implementing the color setting method described above, including a display circuit 201, an input circuit 202 and a control circuit 203, for example.

The control circuit 203 is configured to implement actions or processes including: controlling the display circuit 201 to display multiple groups of color pictures respectively according to a pre-set sequence, wherein each group of color pictures includes at least two pictures, and each picture includes at least one color component; marking a selected picture in each group of color pictures through the input circuit 202 in response to a first operation by a user; acquiring color preferences regarding a user according to a plurality of selected pictures and color components of each picture; setting color parameters of the display device according to the color preferences.

It is understood that the display device 200 may be any product or component having a display function such as a cell phone, a tablet computer, a television, a display device, a notebook computer, a wearable device, or a navigator.

In the present embodiment, by setting the display device 200 to respectively display multiple groups of color pictures, and setting the color parameters of the display device 200 according to the color preferences determined by the pictures selected by the user, the user can be provided with personalized setting of the color preferences in an intuitive manner, so that the display device 200 has display parameters with adjustable styles, improves the adaptability to the user's requirements, and has a wide application prospect.

Another embodiment of the present disclosure provides a non-transitory computer readable storage medium having stored thereon a computer program that, when executed by a processor, implements: displaying multiple groups of color pictures respectively according to a pre-set sequence, wherein each group of color pictures includes at least two pictures, and each picture includes at least one color component; marking a selected picture in each group of color pictures in response to a first operation by a user; acquiring a user's color preferences according to a plurality of selected pictures and color components of each picture; setting color parameters of a display device according to the color preferences.

In actual practice, the non-transitory computer readable storage medium may take the form of any combination of one or more computer readable media. The non-transitory computer readable medium may be a computer readable signal medium or a computer readable storage medium. The non-transitory computer readable storage medium may be, for example but not limited to, an electronic, magnetic, optical, electromagnetic, infrared, or semiconductor system, device, or means, or a combination of any of the above. More specific examples (a non-exhaustive list) of non-transitory computer readable storage media include: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In this embodiment, a non-transitory computer readable storage medium may be any tangible medium that contains or stores a program that can be used by or in connection with an instruction execution system, device, or means.

The computer readable signal medium may comprise a data signal embodied in baseband or propagated as part of a carrier wave carrying the computer readable program code. Such propagated data signals may take many forms, including but not limited to, electromagnetic signals, optical signals, or any suitable combination of the preceding. The computer readable signal medium can also be any computer readable medium other than a computer readable storage medium that can send, propagate, or transmit the program for use by or in connection with the instruction execution system, device, or means.

The program code embodied on the non-transitory computer readable medium may be transmitted over any suitable medium including, but not limited to, wireless, electrical wire, fiber optic cable, RF, etc. or any suitable combination of the preceding.

Computer program code for carrying out embodiments provided by the present disclosure may be written in one or more programming languages, or combinations thereof, including object-oriented programming languages, such as Java, smalltalk, C++, and conventional procedural programming languages, such as the "C" language or similar programming languages. The program code may execute entirely on the user's computer, partly on the user's computer, as a stand-alone software package, partly on the user's computer partly on a remote computer or entirely on the remote computer or server. In the case of a remote computer, the remote computer may be connected to the user's computer through any kind of network, including a local area network (LAN) or a wide area network (WAN), or it may be connected to an external computer (e.g. through the Internet by an Internet Service Provider).

Figure 3:
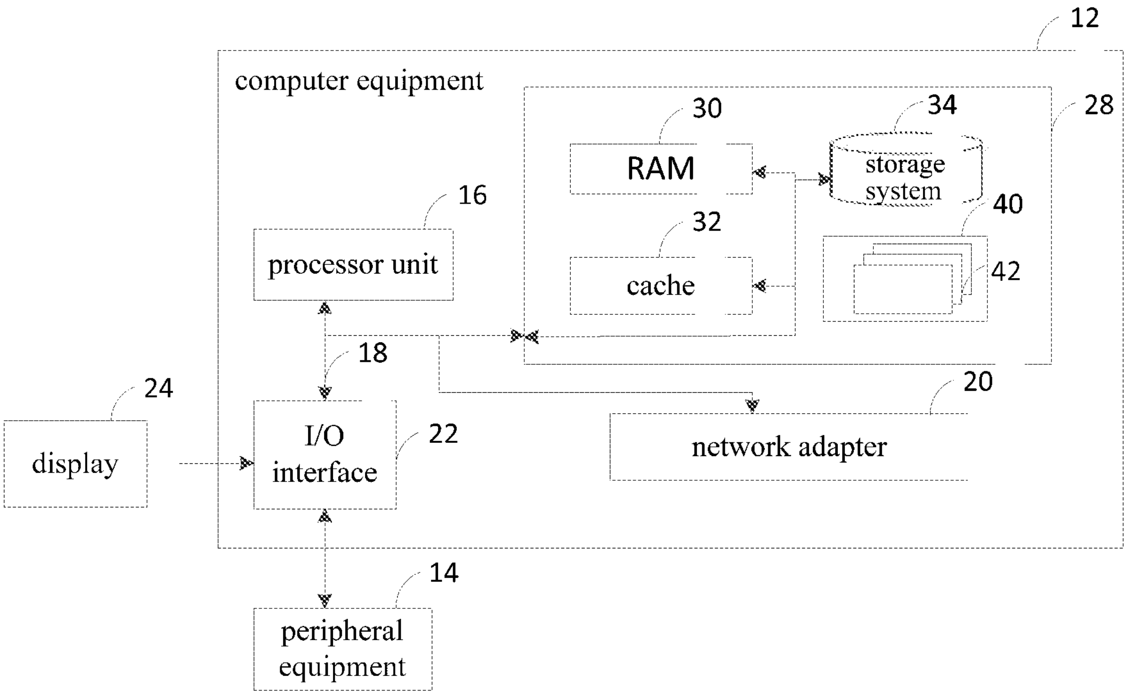
FIG. 3 shows a schematic view of computer equipment according to another embodiment of the present disclosure.

Additionally, as shown in FIG. 3, another embodiment of the present disclosure provides a schematic view of computer equipment 12. The computer equipment 12 shown in FIG. 3 is merely an example and should not pose any limitation on the scope of use or functionality of embodiments of the present disclosure.

As shown in FIG. 3, the computer equipment 12 is in the form of general purpose computing equipment. Components of computer equipment 12 may include, but are not limited to: one or more processors or processing units 16, a system memory 28, and a bus 18 connecting the various system components, including the system memory 28 and the processing units 16.

Bus 18 represents one or more of several types of bus structures, including a memory bus or memory controller, a peripheral bus, an accelerated graphics port, a processor, or a local bus using any of a variety of bus architectures. By way of example, such architectures include, but are not limited to, industry Standard Architecture (ISA) bus, micro Channel Architecture (MAC) bus, enhanced ISA bus, video Electronics Standards Association (VESA) local bus, and Peripheral Component Interconnect (PCI) bus.

Computer equipment 12 typically includes a variety of computer system readable media. Such media may be any available media that can be accessed by computer equipment 12 and includes both volatile and nonvolatile media, removable and non-removable media.

The system memory 28 may include computer system readable media in the form of volatile memory, such as random access memory (RAM) 30 and/or cache memory 32. Computer equipment 12 may further include other removable/non-removable, volatile/nonvolatile computer system storage media. By way of example only, storage system 34 may be used to read from and write to non-removable, non-volatile magnetic media (not shown in FIG. 3, commonly referred to as a "hard drive"). Although not shown in FIG. 3, a magnetic disk drive for reading from and writing to a removable nonvolatile magnetic disk (e.g. a "floppy disk") and an optical disk drive for reading from or writing to a removable nonvolatile optical disk (e.g. a CD-ROM, DVD-ROM, or other optical media) may be provided. In these cases, each drive may be connected to bus 18 through one or more data media interfaces. Memory 28 may include at least one program product having a set (e.g. at least one) of program modules configured to perform the functions of embodiments of the present disclosure.

A program/utility 40, having a set (at least one) of program modules 42, including but not limited to an operating system, one or more application programs, other program modules, and program data, may be stored in, for example, memory 28, each of these examples, or some combination thereof, possibly including an implementation of a network environment. Program modules 42 generally perform the functions and/or methods of the embodiments described in this disclosure.

The computer equipment 12 may also communicate with one or more peripheral equipment 14 (e.g. keyboard, pointing device, display device 24, etc.), one or more devices that enable a user to interact with the computer equipment 12, and/or any device (e.g. network card, modem, etc.) that enables the computer equipment 12 to communicate with one or more pieces of other computing equipment. Such communication may occur through an input/output (I/O) interface 22. Further, computer equipment 12 may also communicate with one or more networks (e.g. a local area network (LAN), a wide area network (WAN), and/or a public network such as the Internet) through network adapter 20. As shown in FIG. 3, the network adapter 20 communicates with other modules of the computer equipment 12 over the bus 18. It should be understood that although not shown in FIG. 3, other hardware and/or software modules may be used in conjunction with computer equipment 12 including, but not limited to: microcode, device drivers, redundant processing units, external disk drive arrays, RAID systems, tape drives, and data backup storage systems, among others.

The processor unit 16 executes programs stored in the system memory 28 to perform various functional applications and data processing, for example, to implement a color setting method of a display device provided by an embodiment of the present disclosure.

The present disclosure addresses the existing problems by formulating a color setting method for a display device, a display device, a computer readable storage medium and computer equipment, and by respectively displaying multiple groups of color pictures on the display device, setting color parameters of the display device according to color preferences determined by a picture selected by a user, thereby enabling the user to obtain a required color setting in an intuitive manner, thereby enabling the display device to have display parameters with adjustable styles, so that the display device can satisfy various requirements of different users for display effects, and has a wide application prospect.

It is to be understood that the above-described embodiments of the present disclosure are merely illustrative of and not restrictive on the implementations of the present disclosure. For those of ordinary skill in the art to which the present disclosure pertains, many other variations and modifications are possible in the light of the above teachings. It is not intended to be exhaustive herein, and all such variations and modifications are still in the scope of protection of the present disclosure.

What is claimed is:

1. A method comprising:

displaying multiple groups of color pictures, one group at a time, on a display device;

wherein each group comprises at least two color pictures, each group is associated with color components belong in multiple types, and all the color pictures in each group are different in the color components the each group is associated with;

wherein the types are selected from a group consisting of brightness, contrast, saturation, hue, clarity, backlight, color temperature, noise reduction, color enhancement and gamma;

wherein the multiple types which the color components different groups are associated with belong to do not have any type in common;

obtaining one selected picture from each of the groups of color pictures in response to a first operation by a user;

combining types of the color components of the selected pictures and corresponding values of the types of the color components of the selected pictures into a set;

obtaining color preferences regarding the user according to the types of the color components of the selected pictures and the corresponding values of the types of the color components of the selected pictures within the combined set; and setting color parameters of the display device according to the color preferences regarding the user.

2. The method according to claim 1, wherein the obtaining color preferences of the user according to the selected pictures and the color components the groups are associated with further comprises:

obtaining color data regarding the user according to the selected pictures and the color components the groups are associated with; and correcting the color data according to a preset preference template and obtaining the color preferences regarding the user.

3. The method according to claim 2, wherein the obtaining color preferences of the user according to the selected pictures and the color components the groups are associated with further comprises:
   reading color parameters of the display device; and
   obtaining color data regarding the user according to color parameters of the display device, the selected pictures, and the color components the groups are associated with.

4. The method according to claim 2, wherein:
   the obtaining color data regarding the user according to the selected pictures and the color components the groups are associated with further comprises: uploading the selected pictures and the color components the groups are associated with to a remote server so as to obtain the color data regarding the user; and
   the correcting the color data according to a preset preference template and obtaining color preferences regarding the user further comprises: causing the remote server to correct the color data according to the preset preference template to obtain color preferences regarding the user.

5. The method according to claim 1, wherein before displaying multiple groups of color pictures, one group at a time, on a display device, the method further comprises:
   displaying color preference setting options;
   selecting to set the color preferences in response to a second operation by the user, or
   cancelling the setting of the color preferences in response to a third operation by the user.

6. The method according to claim 5, wherein the selecting to set the color preferences in response to a second operation by the user further comprises:
   uploading configuration parameters of the display device to a remote server; and
   downloading multiple groups of color pictures corresponding to the display device from the remote server.

7. The method according to claim 5, wherein after the displaying color preference setting options and before the selecting to set the color preferences in response to a second operation by the user, the method further comprises:
   displaying color restoration setting options;
   selecting to restore the components in response to a fourth operation by the user, or
   cancelling the restoring of the color components in response to a fifth operation by the user.

8. The method according to claim 1, wherein each group of color pictures includes at least two pictures having the same picture content.

9. A display device comprising a memory, a processor, and a computer program stored in the memory and executable on the processor, wherein the processor when executing the program implements a method, the method comprising:
   displaying multiple groups of color pictures, one group at a time, on a display device, wherein each group comprises at least two color pictures, each group is associated with color components belong in multiple types, and all the color pictures in each group are different in the color components the each group is associated with; wherein the types are selected from a group consisting of brightness, contrast, saturation, hue, clarity, backlight, color temperature, noise reduction, color enhancement and gamma; wherein the multiple types which the color components different groups are associated with belong to do not have any type in common;
   obtaining one selected picture from each of the groups of color pictures in response to a first operation by a user;
   combining types of the color components of the selected pictures and corresponding values of the types of the color components of the selected pictures into a set;
   obtaining color preferences regarding the user according to the types of the color components of the selected pictures and the corresponding values of the types of the color components of the selected pictures within the combined set; and
   setting color parameters of the display device according to the color preferences regarding the user.

10. The display device according to claim 9, wherein the obtaining color preferences of the user according to the selected pictures and the color components the groups are associated with further comprises:
   obtaining color data regarding the user according to the selected pictures and the color components the groups are associated with; and
   correcting the color data according to a preset preference template and obtaining the color preferences regarding the user.

11. The display device according to claim 10, wherein the obtaining color preferences of the user according to the selected pictures and the color components the groups are associated with further comprises:
   reading color parameters of the display device; and
   obtaining color data regarding the user according to color parameters of the display device, the selected pictures, and the color components the groups are associated with.

12. The display device according to claim 10, wherein:
   the obtaining color data regarding the user according to the selected pictures and the color components the groups are associated with further comprises: uploading the selected pictures and the color components the groups are associated with to a remote server so as to obtain the color data regarding the user; and
   the correcting the color data according to a preset preference template and obtaining color preferences regarding the user further comprises: causing the remote server to correct the color data according to the preset preference template to obtain color preferences regarding the user.

13. The display device according to claim 9, wherein before displaying multiple groups of color pictures, one group at a time, on a display device, the method further comprises:
   displaying color preference setting options;
   selecting to set the color preferences in response to a second operation by the user, or
   cancelling the setting of the color preferences in response to a third operation by the user.

14. The display device according to claim 13, wherein the selecting to set the color preferences in response to a second operation by the user further comprises:
   uploading configuration parameters of the display device to a remote server; and
   downloading multiple groups of color pictures corresponding to the display device from the remote server.

15. The display device according to claim 13, wherein after the displaying color preference setting options and before the selecting to set the color preferences in response to a second operation by the user, the method further comprises:
   displaying color restoration setting options;
   selecting to restore the components in response to a fourth operation by the user, or cancelling the restoring of the color components in response to a fifth operation by the user.

16. The display device according to claim 9, wherein each group of color pictures includes at least two pictures having the same picture content.

17. A non-transitory computer readable storage medium having a computer program stored thereon, wherein the computer program when executed by a processor implements a method, the method comprising:

displaying multiple groups of color pictures, one group at a time, on a display device, wherein each group comprises at least two color pictures, each group is associated with color components belong in multiple types, and all the color pictures in each group are different in the color components the each group is associated with; wherein the types are selected from a group consisting of brightness, contrast, saturation, hue, clarity, backlight, color temperature, noise reduction, color enhancement and gamma; wherein the multiple types which the color components different groups are associated with belong to do not have any type in common;

obtaining one selected picture from each of the groups of color pictures in response to a first operation by a user;

combining types of the color components of the selected pictures and corresponding values of the types of the color components of the selected pictures into a set;

obtaining color preferences regarding the user according to the types of the color components of the selected pictures and the corresponding values of the types of the color components of the selected pictures within the combined set; and setting color parameters of the display device according to the color preferences regarding the user.

18. The non-transitory computer readable storage medium according to claim 17, wherein the obtaining color preferences of the user according to the selected pictures and the color components the groups are associated with further comprises:

obtaining color data regarding the user according to the selected pictures and the color components the groups are associated with; and correcting the color data according to a preset preference template and obtaining the color preferences regarding the user.

19. The non-transitory computer readable storage medium according to claim 18, wherein the obtaining color preferences of the user according to the selected pictures and the color components the groups are associated with further comprises:

reading color parameters of the display device; and obtaining color data regarding the user according to color parameters of the display device, the selected pictures, and the color components the groups are associated with.

20. The non-transitory computer readable storage medium according to claim 18, wherein:

the obtaining color data regarding the user according to the selected pictures and the color components the groups are associated with further comprises: uploading the selected pictures and the color components the groups are associated with to a remote server so as to obtain the color data regarding the user; and the correcting the color data according to a preset preference template and obtaining color preferences regarding the user further comprises: causing the remote server to correct the color data according to the preset preference template to obtain color preferences regarding the user.

* * * * *